US006766517B1

(12) United States Patent
Bernardo

(10) Patent No.: US 6,766,517 B1
(45) Date of Patent: Jul. 20, 2004

(54) SYSTEM AND METHOD FOR FACILITATING THREAD-SAFE MESSAGE PASSING COMMUNICATIONS AMONG THREADS IN RESPECTIVE PROCESSES

(75) Inventor: Dan Bernardo, Westwood, MA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/417,823

(22) Filed: Oct. 14, 1999

(51) Int. Cl.[7] .............................................. G06F 9/46
(52) U.S. Cl. ..................................... 719/313; 718/102
(58) Field of Search ................................. 719/312, 313, 719/315, 316, 310, 311; 718/102–108

(56) References Cited

U.S. PATENT DOCUMENTS

| | | | | | |
|---|---|---|---|---|---|
| 5,313,638 | A | * | 5/1994 | Ogle et al. ................... | 710/200 |
| 5,706,516 | A | * | 1/1998 | Chang et al. ................ | 709/314 |
| 6,105,049 | A | * | 8/2000 | Govindaraju et al. ........ | 709/102 |
| 6,539,435 | B2 | * | 3/2003 | Bolmarcich et al. ......... | 709/310 |

OTHER PUBLICATIONS

"MPI: A Message–Passing Interface Standard," Aug. 1997, Chapter 3.2.4, 3.8, and 4.1., obtained from www.mpi-forum.org.*
"MPI: A Message–Passing Interface Standard," Aug. 1997, Chapter 3.2.4, 3.8, and 4.1.*

* cited by examiner

*Primary Examiner*—Meng-Al T. An
*Assistant Examiner*—Li B. Zhen
(74) *Attorney, Agent, or Firm*—Chapin & Huang, LLC; Barry W. Chapin, Esq.

(57) ABSTRACT

A system for facilitating thread-safe message passing communications among threads in respective processes includes arrangements for coordinating collective communication operations, as between collective and non-collective communication operations, and as among threads in a process receiving messages contemporaneously. For collective communication operations, a master thread is provided and each process is provided with a slave thread. When a user thread in a process is to engage in a collective operation, it notifies its process's slave thread, which notifies the master process. When the master process has received notifications the slave threads of all of the processes which have user threads that are to engage in the collective operation, it notifies the slave threads that the collective operation is to proceed. As between collective and non-collective operations, the user threads that are to engage in a non-collective operation goes through a locking sequence in which it acquires two locks before transmitting a message, whereas for collective operations the second lock is acquired before the operation is performed. In coordinating message reception, each thread in a process iteratively performs a locked message probe operation in which it initially acquires a message probe lock that regulates the locked message probe operation as among threads in the process, and thereafter determines whether a message is available for the respective thread. The message receive control module, if the message probe control module determines that a message is available for the respective thread, receives the message.

37 Claims, 7 Drawing Sheets

SYSTEM AND METHOD FOR FACILITATING THREAD-SAFE MESSAGE PASSING COMMUNICATIONS AMONG THREADS IN RESPECTIVE PROCESSES

FIELD OF THE INVENTION

The invention relates generally to the field of digital computer systems, and more particularly to systems and methods for facilitating inter-process communications using message passing communication methodologies. The invention specifically provides systems and methods facilitating inter-process communications among processes using message passing methodologies, in a thread-safe manner.

BACKGROUND OF THE INVENTION

Computers typically execute programs in one or more processes, each of which comprises one or more threads. Generally, a process will have an associated address space, which is separate and apart from address-spaces associated with other processes. Since each process has its own address space, the likelihood that a process's program code, data and data structures associated with the process will be corrupted by processing operations in connection with other processes will be minimized. On the other hand, all of the threads in a respective process will share the same address space, which can lead to problems. For example, since all threads in a process share the same address space, each thread can access program code, data and data structures associated with other threads, and care needs to be taken to regulate such access.

In a number of applications, threads in various processes need to communicate to either obtain data from threads in other processes, or to transmit data to threads in other processes. To accommodate such communication, various communication methodologies have been developed. In one such communication methodology, known as "message passing," a thread in one process can, as a source thread, transmit a message to a thread in another process, as a destination process, using messages containing the data to be transferred. One popular message passing mechanism, referred to as "MPI" ("Message Passing Interface"), provides a message passing arrangement to facilitate transfer of messages among threads in respective processes. Several MPI specifications define an interface that threads can use to make use of an MPI message passing arrangement.

A number of problems arise in connection with communication among threads in respective processes using message passing mechanisms such as those defined by the MPI specifications. Generally, to ensure that, when a "source" thread in one process is to send a message to a "destination" thread in another process, each thread uses locking functions, such as the "mutex" ("mutual exclusion") functions available in the Unix operating system, to protect the message passing operation and ensure that it operates in a "thread-safe" manner. In particular, the source thread uses the mutex function to ensure that no other thread in its process attempts to send a message while it is engaged in performing the MPI calls required to initiate the message passing operation. In addition, the destination thread uses the mutex function to ensure that no other thread in its process will be attempting to receive a message while it (that is, the destination thread) is attempting to do so, which might result in the other thread erroneously receiving the message directed to the destination thread. However, serializing receive operations using mutexes in such a manner can cause deadlock problems since it prevents the other threads in the destination thread's process from receiving and processing incoming messages.

Another problem arises in connection with collective operations such as, for example, broadcast, barrier synchronization, and reduction operations described in U.S. patent application Ser. No. 09/303,465, filed Apr. 30, 1999, in the name of Rolf H. vandeVaart, et al., entitled System And Method For Facilitating Communication Among A Plurality Of Processes In A Digital Computer System, (hereinafter, "the vandeVaart application") assigned to the assignee of the present application and incorporated by reference. Generally, in collective operations such as those described in the vandeVaart application, one thread in each of a plurality of processes will be engaged in the collective operation, and may be transmitting messages to threads in other processes and/or receiving messages from threads in other processes. In a collective operation, the individual messages transmitted between threads in the respective processes are typically "point-to-point" messages, similar to the messages transmitted between threads in respective processes in a non-collective message passing operation. In a collective operation, a considerable amount of coordination is required as among the threads in the processes that are to be engaged in the collective operation. In addition, collective operations need to be given a higher priority than non-collective message passing operations, otherwise non-collective operations may prevent collective operations from completing.

SUMMARY OF THE INVENTION

The invention provides a new and improved system and method facilitating inter-process communications among processes using message passing methodologies, in a thread-safe manner.

In brief summary, the invention in one aspect provides a collective communications coordinating arrangement for coordinating a collective communications operation among user threads in a plurality of processes, the user threads being configured to communicate using a selected message passing methodology. The collective communications coordinating arrangement comprises a master thread and, associated with each of the processes, a respective slave thread. The slave thread, in response to a collective communications request from a respective user thread in its associated process, generates a collective communications request message for transmission to the master thread. The master thread, after receiving collective communications request messages from all of the slave threads associated with processes that contain threads that are to engage in the collective communications operation, generate a collective communications grant for transmission to the slave threads of all of the processes which contain threads which are to engage in the collective communications operation. In response to a collective communications grant from the master thread, the slave threads enable the respective user threads to engage in the collective communications operation.

In one embodiment, the collective communications grant includes two messages transmitted by the master thread to the slave threads. In response to the initial communication grant message, each slave thread acquires a message transmission regulation lock that regulates transmission of messages by threads in the process. In response to the second communication grant message, each slave thread transfers control to the user thread that is to engage in the collective communications operation.

In another aspect, the invention provides a communications coordinating arrangement for coordinating collective and non-collective communications operations among user threads in a process, the user threads being configured to communicate using a selected message passing methodology. The communications coordinating arrangement comprises associated with each the thread to engage in a non-collective communications operation, a non-collective communication operation control module and, associated with each the thread to engage in a collective communications operation, a collective communication operation control module. The non-collective communication operation control module, when the thread is to engage in a non-collective communication operation, initially performs a first lock operation to acquire a non-collective communication regulation lock which regulates transmission of messages in non-collective communications operations as among threads in the process and, after it has acquired the non-collective communication regulation lock, performs a second lock operation to acquire a general communication regulation lock. Each thread that is to engage in a non-collective communications operation is configured to not engage in a non-collective communication operation until after it has acquired both the non-collective communication regulation lock and the general communication regulation lock. The collective communication operation control module, when the thread is to engage in a collective communication operation, performs a lock operation to acquire the general communication regulation lock, and each thread that is to engage in a collective communications operation being configured to not engage in a non-collective communication operation until after it has acquired the general communication regulation lock. Since the locking sequence for collective communication operations is shorter than the locking sequence for non-collective communication operations, collective operations have somewhat higher priority than non-collective operations.

Yet another aspect provides a mechanism whereby a plurality of threads in a process can be in condition to receive messages contemporaneously and ensure that the thread correctly receives a message intended for it. In that aspect, the invention provides a communications coordinating arrangement for coordinating message receive operations among user threads in a process, the user threads being configured to communicate using a selected message passing methodology. The communications coordinating arrangement comprises, associated with each thread a probe control module and a message receive control module. The probe control module iteratively performs a locked message probe operation in which it initially acquires a message probe lock that regulates the locked message probe operation as among threads in the process, and thereafter determines whether a message is available for the respective thread. The message receive control module, if the message probe control module determines that a message is available for the respective thread, receives the message.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
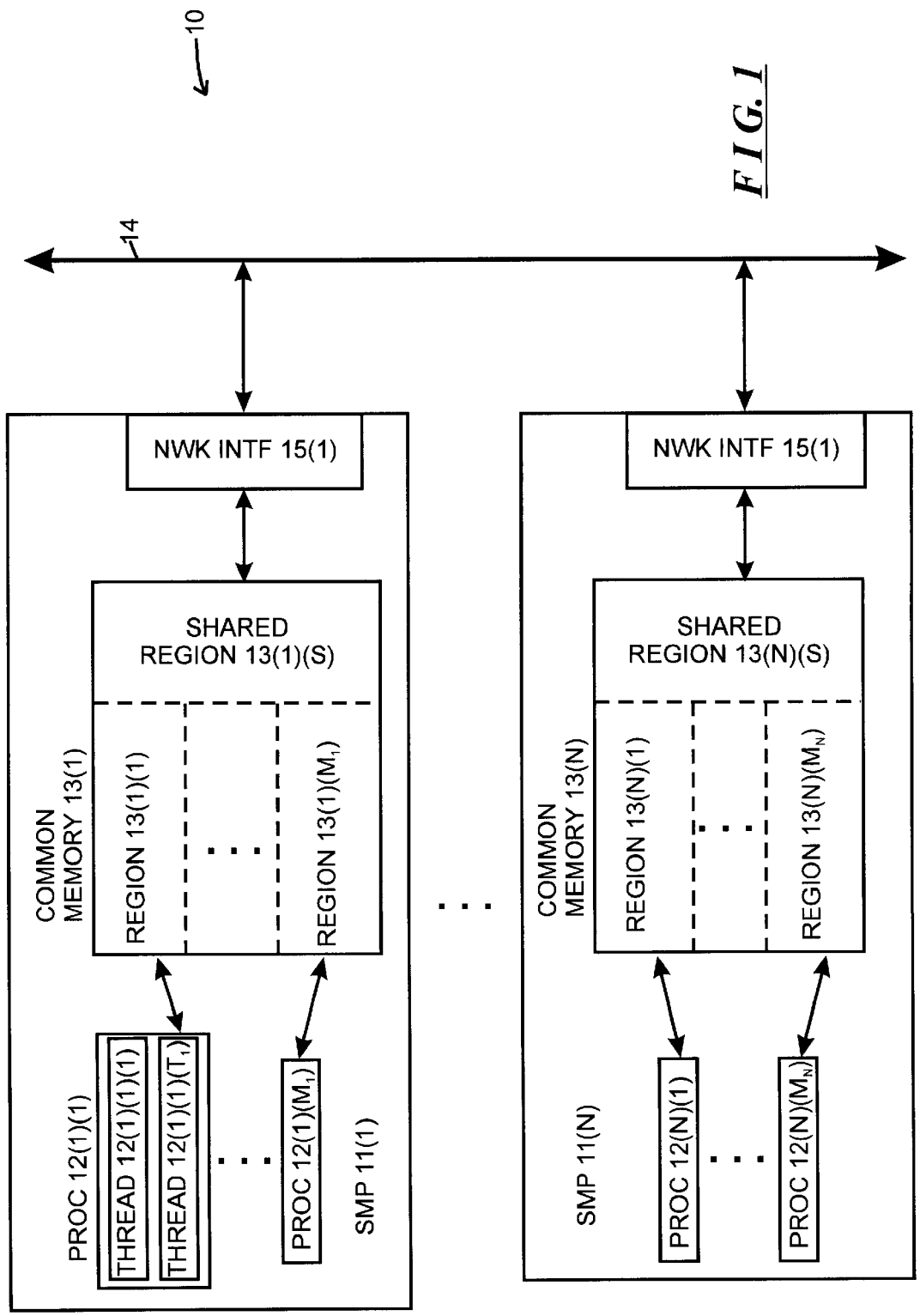
FIG. 1 schematically depicts a computer system including an arrangement for facilitating inter-process communications among processes using a message passing methodology, in a thread-safe manner, constructed in accordance with the invention.

FIG. 1 schematically depicts a computer system 10 including an arrangement for facilitating inter-process communications among processes using message passing methodologies, in a thread-safe manner, constructed in accordance with the invention. Generally, the computer system 10 includes one or more computers 11(1) through 11(N) (generally identified by reference numeral 11($n$)), interconnected by a network represented by communication link 14. Some of the computers 11($n$) are constructed along a symmetric multi-processor ("SMP") architecture, with each SMP including hardware resources comprising a plurality of processors (not separately shown) which share common memory resources (also not separately shown). In the following, it will be assumed that the computers 11($n$) are all constructed along the lines of an SMP architecture, and may also be referenced as SMP's 11($n$). In the computer 10 depicted in FIG. 1, each SMP 11($n$) can process in parallel a plurality of processes 12(1)(1) through 12(N)($M_N$) (generally identified by reference numeral 12($n$)($m$)) organized in one or more programs. Each process 12($n$)($m$), in turn, comprises one or more threads generally identified by reference numeral 12($n$)($m$)($t$). The processes 12($n$)($m$) in each SMP 11($n$) share a common memory 13($n$), with each process being allocated an address space represented by respective region 13($n$)($m$) of the memory 13($n$). Each of the respective process's threads, in turn, makes use of the respective process's region 13($n$)($m$) of the memory 13($n$). The total number of processes 12($n$)($m$) which each SMP 11($n$) can execute may be greater than the total number of processors which the respective SMP 11($n$) maintains, and, if so, the computer's operating system (not shown) will enable the processes to be executed in a series of time intervals or slots, with selected ones of the processes 12($n$)($m$) being executed at any point in time.

As noted above, each process 12($n$)($m$) is allocated a region 13($n$)($m$) of the common memory 13($n$), which it will normally use in its processing operations. Each memory 13($n$) also contains a shared region of memory, identified by reference numeral 13($n$)(S), which is accessible to all of the processes 12($n$)($m$). Each thread 12($n'$)($m'$)($t'$) can communicate with a thread in another process 12($n'$)($m''$)($t''$) ($m'' \neq m'$, but $t''$ may equal $t'$) to send information thereto by sending one or more messages thereto. The messages effectively result in the storing of information in the memory region 13($n'$)($m''$) of memory 13($n'$) allocated to the process 12($n'$)($m''$) associated with the thread 12($n'$)($m''$)($t''$). A number of message passing methodologies which may be used by the processes 12($n$)($m$) are known to those skilled in the art, including the aforementioned MPI methodology. After the information has been stored into the memory region 13($n'$)($m''$) allocated to that process 12($n'$)($m''$), the process 12($n'$)($m''$) can use the information in its processing operations.

As noted above, the SMP's 11($n$) are interconnected by a communication link 14. Each SMP also includes a network interface 15($n$) to connect the respective SMP 11($n$) to the communication link 14 to facilitate transfer of information among the SMP's 11($n$), and specifically among processes 12($n$)($m$) maintained thereby. For example, a process 12($n'$)($m'$) can communicate with another thread 12($n''$)($m''$)($t''$) (where $n''\neq n'$, but m" may equal m' and t" may equal t') to send information thereto by sending one or more messages thereto. In that case, the messages will be transmitted by the network interface 15($n'$) of SMP 11($n'$) and transmitted over the communication link 14 to the network interface 15($n''$) of SMP 11($n''$), and the network interface 15($n''$) will, in turn, store the information in the memory region 13($n''$)($m''$) associated with the process 12($n''$)($m''$). After the information has been stored into the memory region 13($n''$)($m''$) allocated to that process 12($n''$)($m''$), the process 12($n''$)($m''$) can use the information in its processing operations.

The invention provides an arrangement 20 for facilitating inter-process communications among processes using a message passing methodology such as the MPI message passing methodology, in a thread-safe manner. In particular, the arrangement provides two mechanisms including:

(i) a message transfer operation coordination mechanism for coordinating among collective and non-collective message transfer operations; and (ii) a message destination thread coordination mechanism for coordinating among threads in a process who would otherwise be engaged in a blocking receive operation.

These will be described in connection with FIG. 2.

Figure 2:
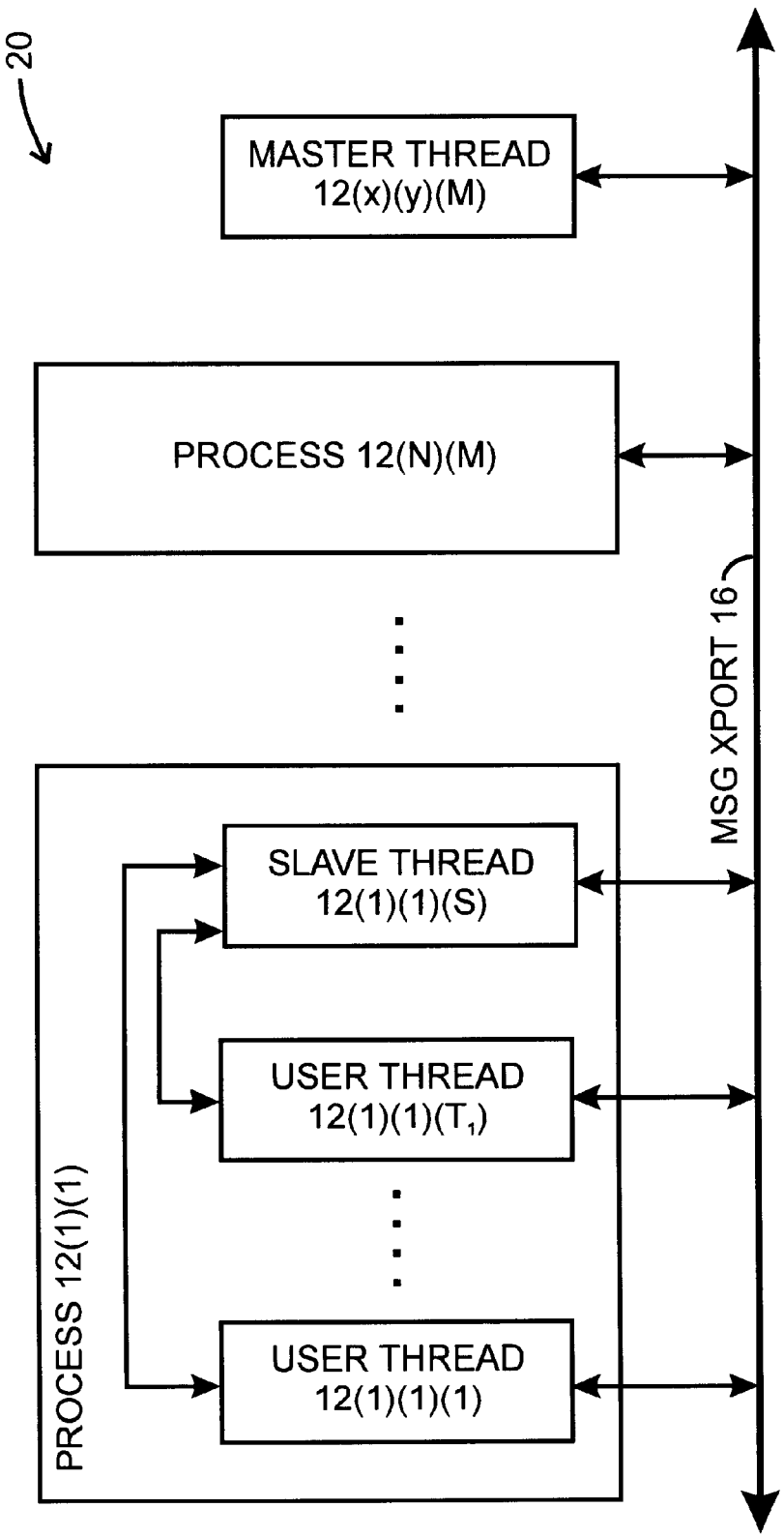
FIG. 2 is a functional block diagram of useful in understanding the operation of the thread-safe inter-process communication arrangement.

FIG. 2 depicts a functional block diagram of the thread-safe inter-process communication arrangement 20 in connection with the invention. As shown in FIG. 2, the arrangement 20 includes, for each process 12($n$)($m$), in addition to user threads 12($n$)($m$)($t$) (which correspond to threads 12($n$)($m$)($t$) described above in connection with FIG. 1), a message transfer operation coordination mechanism comprising master thread 12($x$)($y$)(M) and, associated with each process 12($n$)($m$), a slave thread 12($n$)($m$)(S). The master thread 12($n$)($m$)(M) may comprise a thread in one of the processes 12($n$)($m$), or it may comprise a thread in a separate process (not shown). Within each process 12($n$)($m$), the user threads 12($n$)($m$)($t$) and slave thread 12($n$)($m$)(S) can communicate as described below using conventional intra-process communications methodologies. The user threads 12($n$)($m$)($t$), master thread 12($x$)($y$)(M) and slave threads 12($n$)($m$)(S) transmit messages thereamong using a message transport 16 which operates according to the MPI specification, with the interface between the respective threads and the message transport 16 being defined by the MPI specification as described above.

The message transfer operation coordination mechanism provides coordination among all message transfer operations by all of the user threads 12($n$)($m$)($t$) processed by the computer system 10. When a user thread 12($n'$)($m'$)($t'$), as a source thread, in one process 12($n'$)($m'$) is in condition to transmit a message to another user thread 12($n''$)($m''$)($t''$), as a destination thread, in another process 12($n''$)($m''$), it (that is, the source thread) will send a request to the slave thread 12($n'$)($m'$)(S) in its process 12($n'$)($m'$). The slave thread 12($n'$)($m'$)(S), in turn, sends a message to the master thread 12($n$)($m$)(M) notifying it of the request. When the master thread 12($n$)($m$)(M) determines that the message transfer operation is to proceed, it will send a message to the slave thread 12($n'$)($m'$)(S), which, in turn, sends a grant notification to the user thread 12($n'$)($m'$)($t'$) which is to transmit the message. After the user thread 12($n'$)($m'$)($t'$) receives the grant notification, it can send the message to the destination thread 12($n''$)($m''$)($t''$).

The message transfer operation coordination mechanism also coordinates between collective message transfer operations, such as those described in the aforementioned vandeVaart application, and non-collective message transfer operations. Generally, a collective message transfer operation involves user threads 12($n$)($m$)($t$) in a plurality of respective processes 12($n$)($m$) to facilitate, for example, the broadcast of information from a user thread 12($n'$)($m'$)($t'$) in one process 12($n'$)($m'$) to user threads 12($n''$)($m''$)($t''$), 12($n'''$)($m'''$)($t'''$), . . . in respective processes 12($n''$)($m''$), 12($n'''$)($m'''$), . . . , a barrier synchronization as among user threads 12($n'$)($m'$)($t'$), 12($n''$)($m''$)($t''$), . . . in respective processes 12($n'$)($m'$), 12($n''$)($m''$), . . . , a reduction operation in connection with information provided by user threads 12($n'$)($m'$)($t'$), 12($n''$)($m''$)($t''$), . . . in respective processes 12($n'$)($m'$), 12($n''$)($m''$), and the like. As described in the aforementioned vandeVaart application, each of these collective operations involves transmission of a number of messages as among the user threads 12($n$)($m$)($t$) of the various processes 12($n$)($m$) that are to participate in the collective operation. When a user thread 12($n$)($m$)($t$) is in condition to engage in a collective operation, it notifies the slave thread 12($n$)($m$)(S) in its process. The slave thread 12($n$)($m$)(S), in turn, sends a message to the master thread 12($n$)($m$)(M) notifying it (that is, the master thread 12($n$)($m$)(M)) that a user thread 12($n$)($m$)($t$) in its process is in condition to engage in the collective operation. When the master thread 12($n$)($m$)(M) has received such messages from slave threads 12($n$)($m$)(S) of all of the processes 12($n$)($m$) which contain user threads 12($n$)($m$)($t$) which are to engage in the collective operation, it can send messages to the slave threads 12($n$)($m$)(S) notifying them that the collective operation is to proceed. The slave threads 12($n$)($m$)(S), in turn, can so notify the user threads 12($n$)($m$)($t$), after which the user threads 12($n$)($m$)($t$) can proceed with the collective operation.

As noted above, the message transfer operation coordination mechanism coordinates between collective message transfer operations and non-collective message transfer operation. In that connection, since the master thread 12($n$)($m$)(M) and slave threads 12($n$)($m$)(S) are effectively controlling both non-collective message transfer operations and collective message transfer operations, they can allow non-collective message transfer operations to continue until the master thread 12($n$)($m$)(M) receives messages from the slave threads 12($n$)($m$)(S) of all of the processes 12($n$)($m$) which contain user threads 12($n$)($m$)($t$) which are to engage in a collective operation, indicating that they are in condition to engage in the collective operation. After the master thread 12($n$)($m$)(M) has received messages from the slave threads 12($n$)($m$)(S) of all of the processes 12($n$)($m$) which contain user threads 12($n$)($m$)($t$) which are to engage in a collective operation, indicating that they are in condition to engage in the collective operation, it can allow the collective operation to proceed. If, while a collective operation is proceeding, a slave thread 12($n$)($m$)(S) receives a request from one of the user threads 12($n$)($m$)($t$) in its process 12($n$)($m$) (which, it will be appreciated, will not be the user thread that is engaging in the collective operation), it can delay notifying the master thread 12($n$)($m$)(M) of the request until the collective operation has completed.

Thus, the message transfer operation coordination mechanism ensures that, after a collective message transfer operation has begun, non-collective operations involving threads from processes which contain threads that are participating in the collective operation do not interfere with the collective operation. However, if the computer system 10 has any processes whose threads are not involved in a collective operation, the message transfer operation coordination mechanism can allow threads in those processes can engage in non-collective operations while the collective operation is proceeding.

As noted above, the message destination thread coordination mechanism coordinates among threads in a process who would otherwise be engaged in a blocking receive operation. In a blocking receive operation, a user thread $12(n')(m')(t')$ in a process $12(n')(m')$ engaging in a message receive operation can prevent other user threads $12(n')(m')(t'')$, $12(n')(m')(t''')$, ... from contemporaneously engaging in message receive operations. This will ensure that the user thread $12(n')(m')(t')$ correctly receives the message, and that no other thread in the process might erroneously intercept the message. In particular, instead of performing a blocking receive operation, the user threads $12(n')(m')(t')$, $12(n')(m')(t'')$, ... of process $12(n')(m')$ which are to contemporaneously engage in message receive operations, engage in mutex-protected probe operations to determine whether their respective messages have been delivered to the process $12(n')(m')$ by the message transport 16, using MPI_IPROBE calls defined in the aforementioned MPI specification.

Figure 3A:
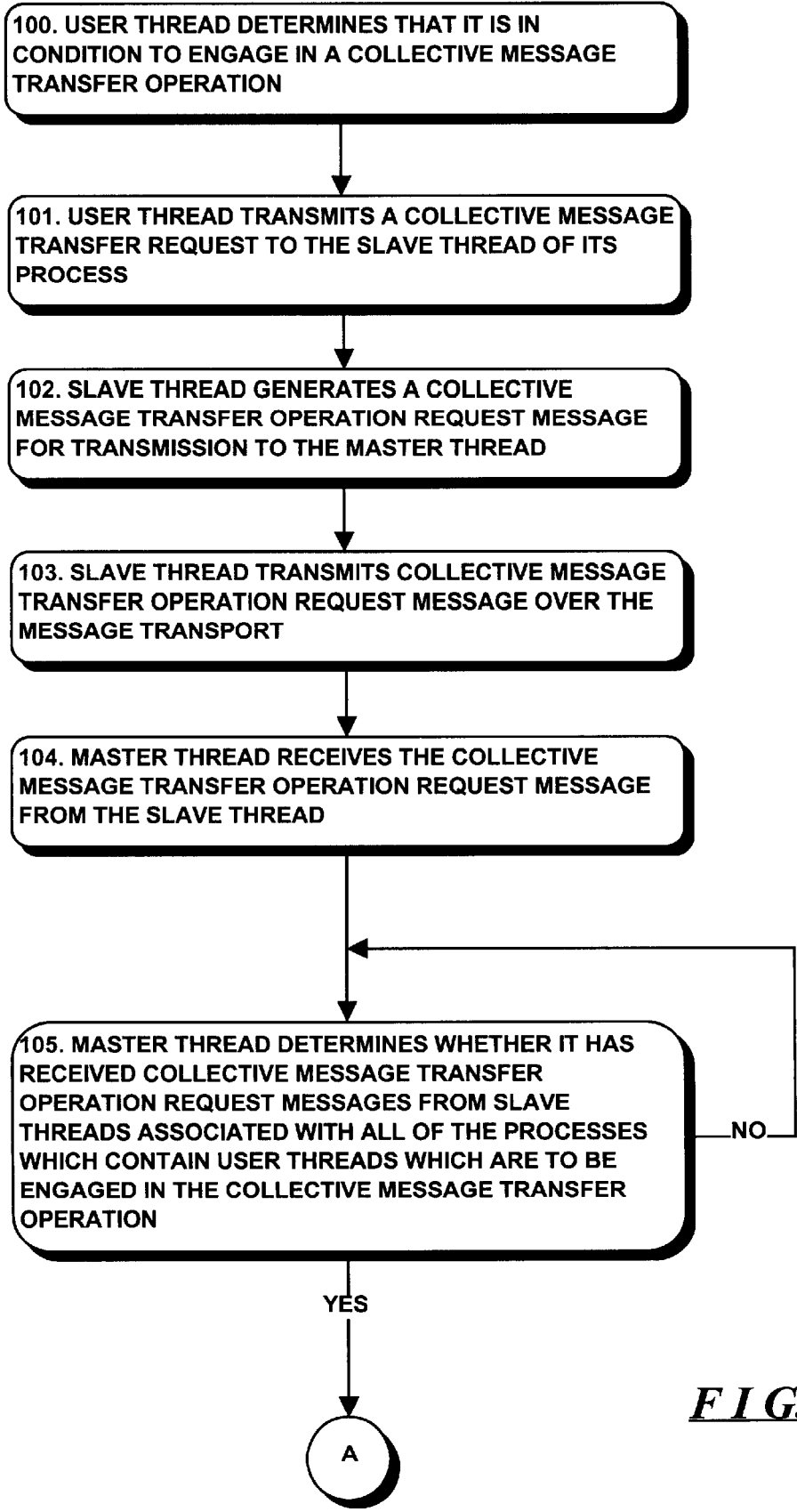
FIGS. 3A through 5 are flow charts of operations performed by the thread-safe inter-process communication arrangement.
Figure 3B:
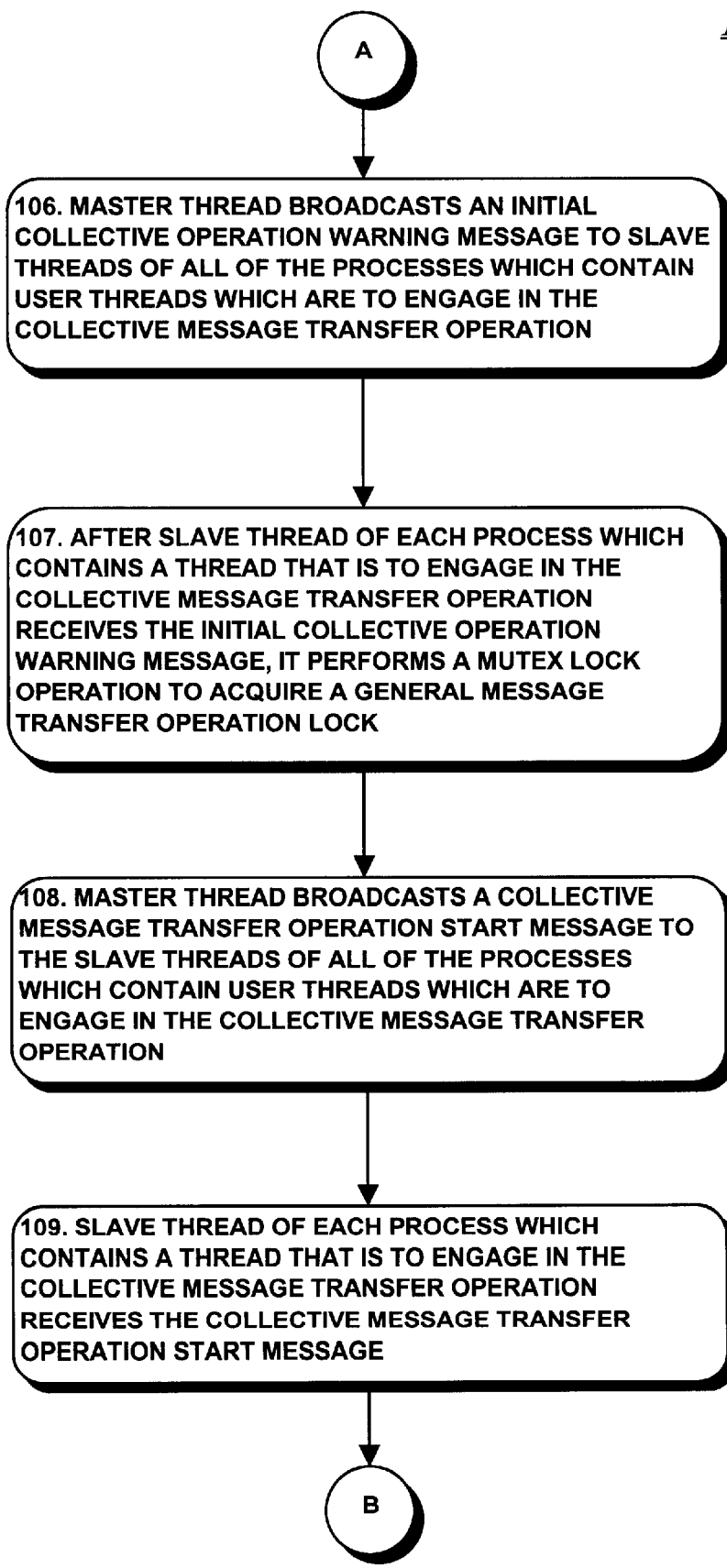
Figure 3C:
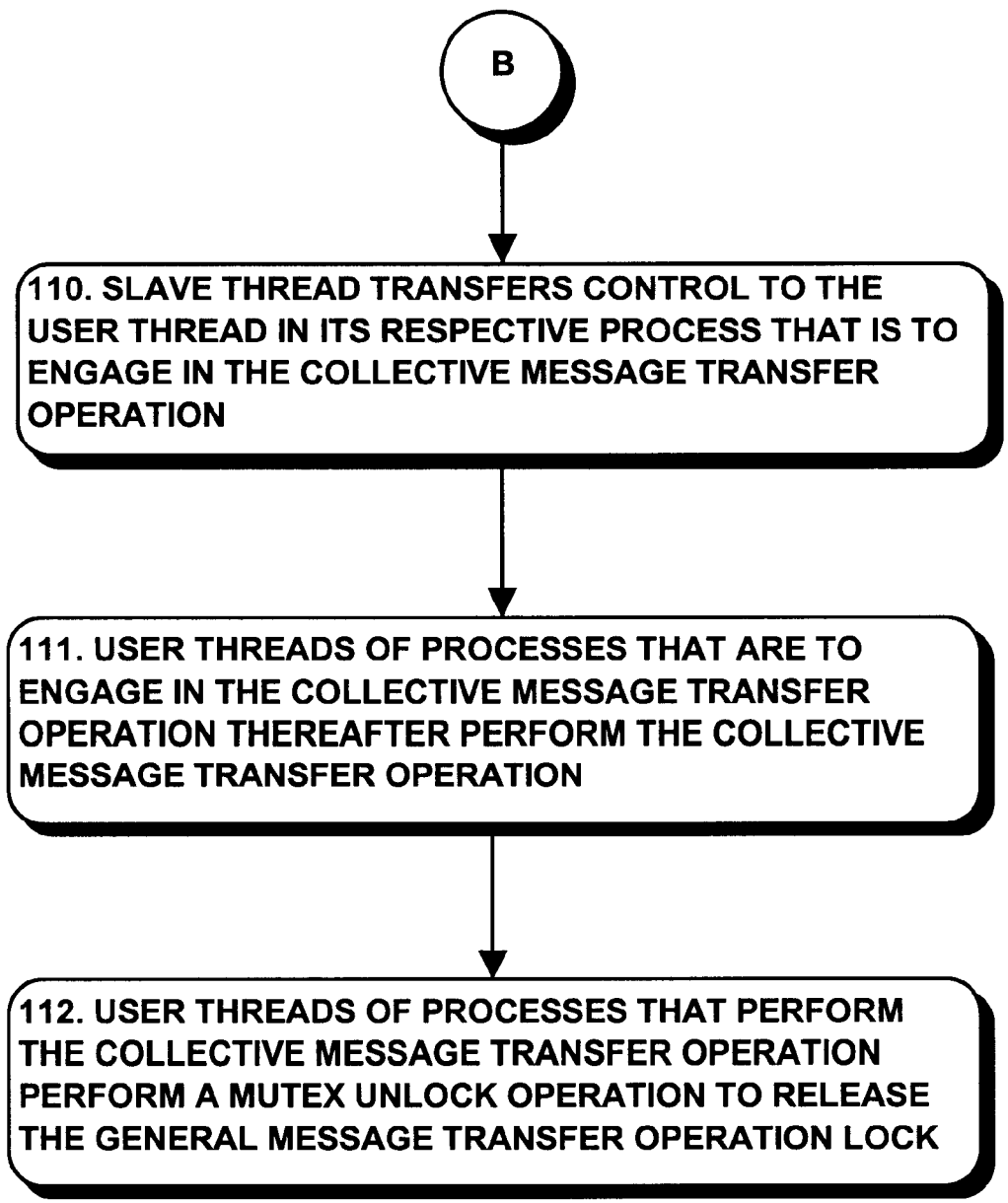

More specifically, and with reference to the flow chart depicted in FIGS. 3A through 3C, in connection with the message transfer operation coordination mechanism, when a user thread $12(n')(m')(t')$ is in condition to engage in a collective message transfer operation (step 100), it initially transmits a collective message transfer request to the slave thread $12(n')(m')(S)$ of its process $12(n')(m')$ (step 101). After the slave thread $12(n')(m')(S)$ receives the collective message transfer request, it will generate a collective message transfer operation request message for transmission to the master thread $12(x)(y)(M)$ (step 102) and transmit the message to the master thread $12(x)(y)(M)$ over the message transport 16 (step 103) thereby to notify the master thread $12(x)(y)(M)$ that the user thread $12(n')(m')(t')$ is in condition to perform the collective operation.

After the master thread $12(x)(y)(M)$ receives the collective message transfer operation request message from the slave thread $12(n')(m')(S)$ (step 104), it (that is, master thread $12(x)(y)(M)$) will determine whether it has received collective message transfer operation request messages from slave threads associated with all of the processes which contain user threads which are to be engaged in the collective message transfer operation (step 105). If it (that is, the master thread $12(x)(y)(M)$) determines that it has not received collective message transfer operation request messages from slave threads associated with all of the processes which contain user threads which are to be engaged in the collective message transfer operation, it will proceed to perform other operations, as described below.

On the other hand, master thread $12(x)(y)(M)$, after receiving the collective message transfer operation request message from slave thread $12(n')(m')(S)$ determined that it has received collective message transfer operation request messages from slave threads associated with all of the processes which contain user threads which are to be engaged in the collective message transfer operation, it will broadcast an initial collective operation warning message to slave threads $12(n)(m)(S)$ of all of the processes $12(n)(m)$ which contain user threads which are to engage in the collective message transfer operation (step 106). After each slave thread $12(n)(m)(S)$ receives the initial collective operation warning message, it performs a mutex lock operation to acquire a general message transfer operation lock (step 107). The general message transfer operation lock is used to prevent user threads other than the user thread $12(n)(m)(t)$ that is to engage in the collective message transfer operation from engaging in a message transfer operation during the collective message transfer operation.

Thereafter, the master thread $12(x)(y)(M)$ broadcasts a collective message transfer operation start message to the slave threads $12(n)(m)(S)$ of all of the processes $12(n)(m)$ which contain user threads which are to engage in the collective message transfer operation (step 108). After each slave thread $12(n)(m)(S)$ receives the collective message transfer operation start message (step 109), it transfers control to the user thread in its respective process $12(n)(m)$ that is to engage in the collective message transfer operation (step 110). The user threads of the respective processes $12(n)(m)$ that are to engage in the collective message transfer operation thereafter perform the collective message transfer operation (step 111), and perform a mutex unlock operation to release the general message transfer operation lock (step 112). After the general message transfer operation lock has been released, any user thread $12(n)(m)(t)$ in the respective process $12(n)(m)$ can perform a mutex lock operation to acquire the general message transfer operation lock and engage in a message transfer operation.

Figure 4:
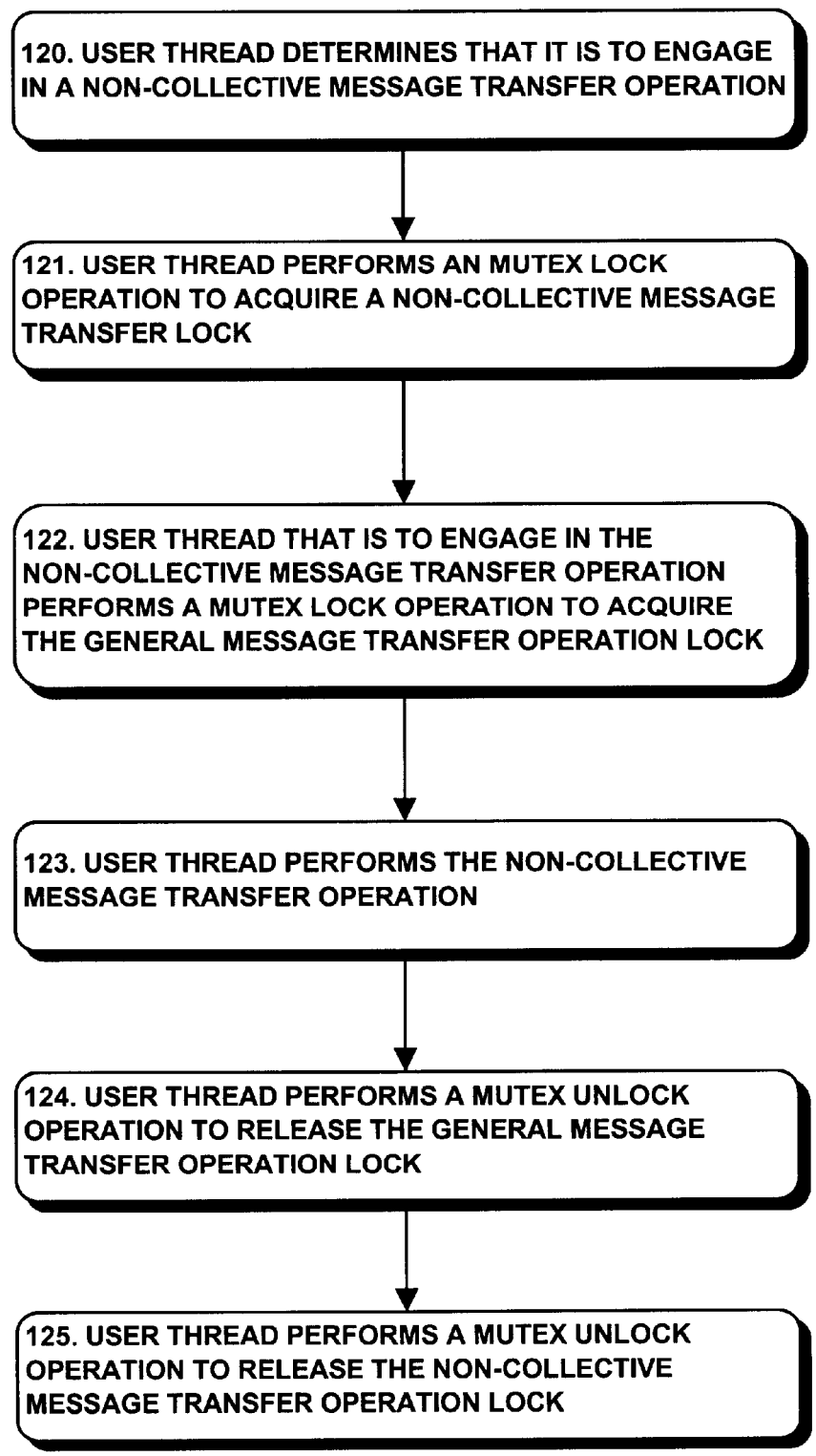

Operations performed in connection with a non-collective message transfer operation will be described in connection with FIG. 4. With reference to FIG. 4, when a user thread $12(n')(m')(t')$ in a process $12(n')(m')$ is to engage in a non-collective message transfer operation (step 120), it initially performs an mutex lock operation to initially acquire a non-collective message transfer lock (step 121). The user thread $12(n')(m')(t')$ will obtain the non-collective message transfer lock if no other user thread in the process $12(n')(m')$ has acquired the non-collective message transfer lock, which will occur if no other user thread $12(m')(n')(t'')$ in the same process $12(n')(m')$ is in the process of performing a non-collective message transfer operation. After the user thread $12(n')(m')(t')$ obtains the non-collective message transfer lock, it (that is, user thread $12(n')(m')(t')$) thereafter performs a mutex lock operation to acquire the general message transfer operation lock (step 122), which, as described above, is used to prevent user threads other than the user thread $12(n')(m')(t')$ that is to engage in the non-collective message transfer operation from engaging in a message transfer operation during the non-collective message transfer operation. Thereafter, the thread $12(n')(m')(t')$ performs the non-collective message transfer operation (step 123), followed by a mutex unlock operation to release the general message transfer operation lock (step 124) and a second mutex unlock operation to release the non-collective message transfer operation lock (step 125). After the non-collective message transfer operation lock has been released, any user thread $12(n)(m)(t)$ in the respective process can perform a mutex lock operation to acquire the non-collective message transfer lock and engage in a non-collective message transfer operation. After the general message transfer operation lock has been released, the slave thread $12(n)(m)(S)$ in the respective process $12(n)(m)$ can perform a mutex lock operation to acquire the general message transfer operation lock and enable a user thread to engage in a collective message transfer operation.

The message transfer operation coordination mechanism provides a number of advantages. In particular, the message transfer operation coordination mechanism facilitates coordination of operations among all of the threads of all of the processes which are to engage in a collective message transfer operation, while at the same time permitting non-collective message transfer operations to continue until all of the threads which are to engage in the collective message transfer operation are in condition to engage in the collective message transfer operation. In addition, since a thread, to engage in a non-collective message transfer operation, needs to sequence through two mutex lock operations, one mutex lock operation to acquire the non-collective message transfer operation lock, and the second mutex lock operation (after the slave thread returns control to it), instead of one mutex lock operation in the case of a collective message transfer operation, collective message transfer operations have a somewhat higher priority than non-collective message transfer operations.

Figure 5:
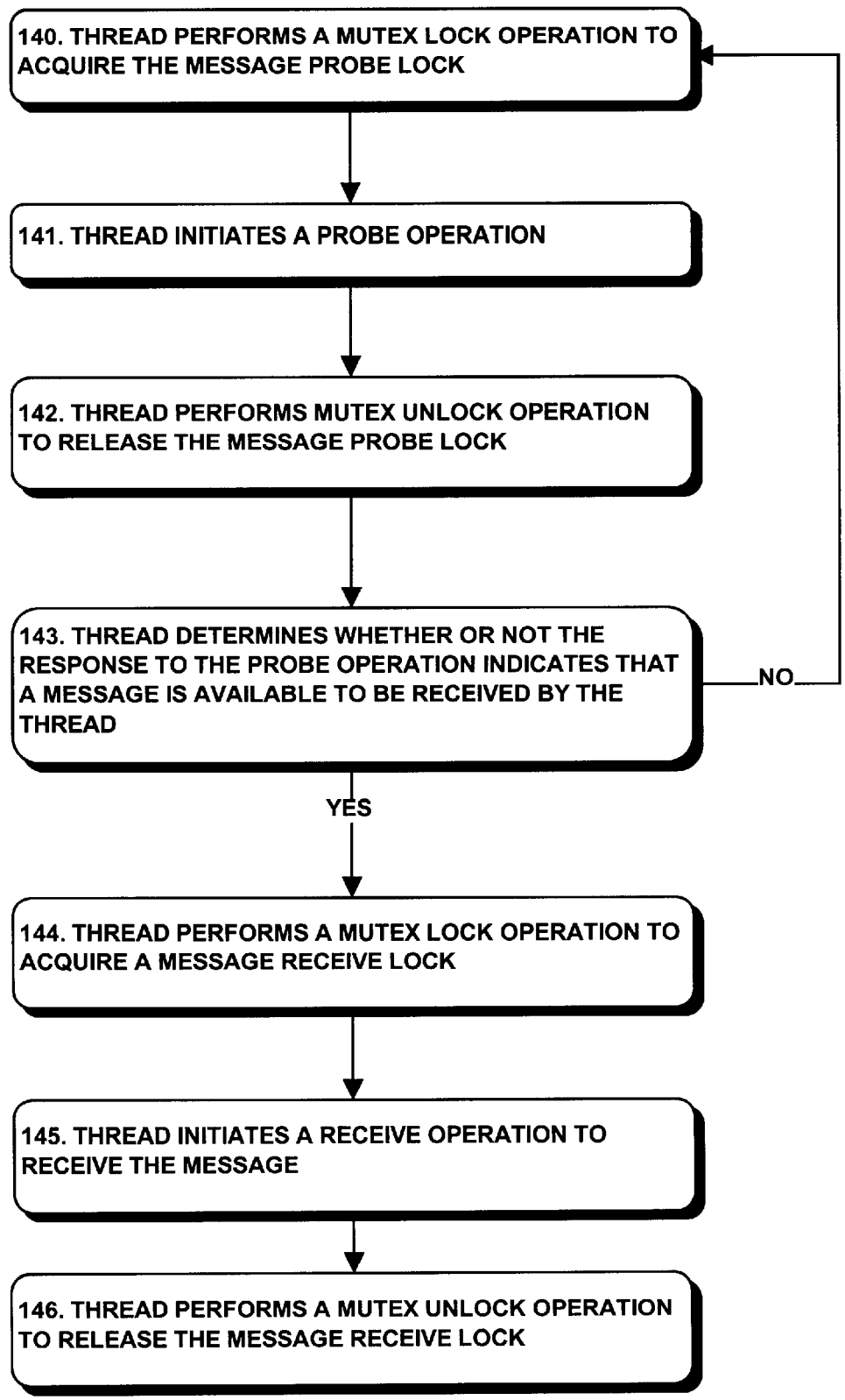

As noted above, the arrangement 20 further includes a message destination thread coordination mechanism for coordinating among threads (which may include the user threads $12(n)(m)(t)$ and the slave thread $12(n)(m)(S)$) in a process $12(n)(m)$ which would otherwise be engaged in a blocking receive operation. Operations performed by the threads in connection with the message destination thread coordination mechanism will be described in connection with FIG. 5. In connection with the message destination thread coordination mechanism, each thread in a process $12(n')(m')$ that would otherwise perform a blocking receive operation, instead of performing the blocking receive operation, in one or more iterations executes a sequence comprising a mutex lock operation, a probe call and a mutex unlock operation. In the mutex lock operation, the respective thread attempts to acquire a message probe lock, and in the mutex unlock operation it releases the message probe lock. After a thread has acquired the message probe lock (step 140), it initiates the probe operation (step 141), during which it (that is, the thread) determines whether a message that matches predetermined criteria is available for it to receive. In one embodiment, in which the message transport 16 transfers messages as defined in the MPI specification, the thread makes use of a non-blocking MPI_IPROBE call, in which the predetermined criteria includes, among other things, a source thread identifier which identifies the thread which is to be the source of the message to be received. In response to the MPI_IPROBE call, the thread receives a response indicating whether or not the message has been received, after which the thread can perform the mutex unlock operation to release the message probe lock (step 142).

After a thread has released the message probe lock, it (that is, the user thread) determines whether or not the response to the MPI_IPROBE call indicates that the message is available to be received by the thread (step 143). If the user thread makes a negative determination, that is, if it determines that the response to the MPI_IPROBE call indicates that the message is not available for the thread to receive, the thread repeats the operations described above.

On the other hand, if the thread determines that the response to the MPI_IPROBE call indicates that a message is available to be received by the thread, the thread can perform a receive operation to receive the message. In that operation, the thread will initially perform a mutex lock operation to acquire a message receive lock (step 144) After the thread has acquired the message receive lock it will initiate a receive operation to receive the message (step 145), and perform a mutex unlock operation to release the message receive lock (step 146). The receive operation may be either a blocking receive operation or a non-blocking receive operation.

The message destination thread coordination mechanism also provides a number of advantages. In particular, it provides a mechanism whereby a plurality of threads in a process can be in condition to receive messages contemporaneously and ensure that the thread correctly receives a message intended for it.

In addition, it will be appreciated that, if the message destination thread coordination mechanism is used in connection with the message transfer operation coordination mechanism, the message destination thread coordination mechanism can be useful in connection with in debugging problems involving misuse of the collective message transfer operations.

It will be appreciated that, although the invention has been described in connection with the message passing operations making use of a message transport that provides an interface defined by the MPI specification, message transports providing interfaces defined by other message passing specifications can also be used.

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. A communications coordinating arrangement for coordinating collective communications operations and non-collective communications operations among user threads in a plurality of processes, said user threads being configured to communicate using a selected message passing methodology, said collective communications coordinating arrangement comprising:

A. associated with each of said processes, a respective slave thread that is configured to, in response to a collective communications request from a respective user thread in its associated process, generate a collective communications request message for transmission to a master thread, and, in response to a collective communications grant from said master thread, enable said respective user thread to engage in said collective communications operation;

B. said master thread being configured to, after receiving collective communications request messages from all of the slave threads associated with processes that contain user threads that are to engage in the collective communications operation, generate said collective communications grant for transmission to the slave threads of all of the processes which contain user threads which are to engage in the collective communications operation; and C. said respective slave thread and said master thread being configured to:

i.) allow, prior to the master thread receiving collective communications request messages from all of the slave threads associated with collective communications requesting user threads, non-collective communications among the collective communications requesting user threads, and ii.) allow, after the master thread receives collective communications request messages from all of the slave threads associated with collective communications requesting user threads and enables the collective communications requesting user threads to engage in the collective communications operation, non-collective communications among user threads not engaged in collective communications operations.

2. The communications coordinating arrangement as defined in claim 1 in which said collective communications grant comprises an initial communication grant message, each slave thread being configured to, in response to said initial communication grant message, acquire a message transmission regulation lock that regulates transmission of messages by threads in said process.

3. The communications coordinating arrangement as defined in claim 2 in which said collective communications grant comprises a second communication grant message generated after said initial communication grant message, each slave thread being configured to, in response to said second communication grant message, transfer control of said thread to said respective user thread in said respective process that is to engage in said collective communications operation.

4. The communications coordinating arrangement as defined in claim 2 in which each user thread is configured to, after performing said collective communications operation, release the message transmission regulation lock.

5. A communications coordinating arrangement for coordinating collective and non-collective communications operations among user threads in a process, said user threads being configured to communicate using a selected message passing methodology, said communications coordinating arrangement comprising:

A. associated with each said user thread to engage in a non-collective communications operation, a non-collective communication operation control module configured to, when said user thread is to engage in the non-collective communications operation, initially perform a first lock operation to acquire a non-collective communication regulation lock which regulates transmission of messages in non-collective communications operations as among user threads in said process and, after the non-collective communication operation control module has acquired the non-collective communication regulation lock, perform a second lock operation to acquire a general communication regulation lock, each user thread that is to engage in the non-collective communications operation being configured to engage in the non-collective communications operation after acquiring both said non-collective communication regulation lock and said general communication regulation lock; and B. associated with each said user thread to engage in a collective communications operation, a collective communication operation control module configured to, when said user thread is to engage in the collective communications operation, perform a lock operation to acquire the general communication regulation lock, each user thread that is to engage in the collective communications operation being configured to engage in a collective communications operation after acquiring said general communication regulation lock.

6. A communications coordinating arrangement as defined in claim 5 in which said non-collective communication operation control module is further configured to release said general communication regulation lock and said non-collective communication regulation lock after said non-collective communications operation.

7. A communications coordinating arrangement as defined in claim 5 in which said collective communication operation control module is further configured to release said general communication regulation lock after said collective communications operation.

8. A communications coordinating arrangement for coordinating message receive operations among user threads in a process, said user threads being configured to communicate using a selected message passing methodology, the communications coordinating arrangement comprising, associated with each thread:

A. a probe control module configured to iteratively perform a locked message probe operation in which it initially acquires a message probe lock that regulates said locked message probe operation as among threads in said process, performs a non-blocking probe operation that allows each user thread to engage in message receive operations at substantially the same time, and determines, in response to the non-blocking probe operation whether a message is available for the respective thread, and B. a message receive control module configured to, if the message probe control module determines that a message is available for the respective thread, receive the message.

9. A communications coordinating arrangement as defined in claim 8 in which the probe control module is further configured to release the message probe lock after determining whether a message is available for the respective thread.

10. A communications coordinating arrangement as defined in claim 8 in which the message receive control module is further configured to acquire a message receive lock prior to receiving the message.

11. A communications coordinating arrangement as defined in claim 10 in which the message receive control module is further configured to release the message receive lock after receiving the message.

12. A method of coordinating collective and non-collective communications operations among user threads in a plurality of processes, said user threads being configured to communicate using a selected message passing methodology, said collective and non-collective communications coordinating method comprising the steps of:

A. for each of said processes, in response to a collective communications request from a respective user thread in its associated process, generating a collective communications request message;

B. after receiving collective communications request messages from all slave threads associated with processes that contain user threads that are to engage in the collective communications operation, generating a collective communications grant for transmission to the slave threads of all of the processes which contain user threads which are to engage in the collective communications operation;

C. in response to the collective communications grant, enabling said respective user thread to engage in said collective communications operation;

D. allowing, prior to receiving collective communications request messages from all of the slave threads associated with collective communications requesting user threads, non-collective communications among the collective communications requesting user threads; and E. allowing, after receiving collective communications request messages from all of the slave threads associated with collective communications requesting user threads and enabling the collective communications requesting user threads to engage in the collective communications operation, non-collective communications among user threads not engaged in collective communications operations.

13. The method as defined in claim 12 in which said collective communications grant comprises an initial communication grant message, and, in response to said initial communication grant message, acquiring a message transmission regulation lock that regulates transmission of messages by threads in said process.

14. The method as defined in claim 13 in which said collective communications grant comprises a second communication grant message generated after said initial communication grant message, and, in response to said second communication grant message, transferring control of said thread to said respective user thread in said respective process that is to engage in said collective communications operation.

15. The method as defined in claim 13 in which each user thread is configured to, after performing said collective communications operation, release the message transmission regulation lock.

16. A method of coordinating collective and non-collective communications operations among user threads in a process, said user threads being configured to communicate using a selected message passing methodology, said communications coordinating method comprising the steps of:

A. enabling each said user thread that is to engage in a non-collective communications operation to, when said user thread is to engage in the non-collective communications operation, initially perform a first lock operation to acquire a non-collective communication regulation lock which regulates transmission of messages in non-collective communications operations as among user threads in said process and, after a non-collective communication operation control module has acquired the non-collective communication regulation lock, perform a second lock operation to acquire a general communication regulation lock, each user thread that is to engage in the non-collective communications operation being configured to engage in the non-collective communications operation after acquiring both said non-collective communication regulation lock and said general communication regulation lock; and B. enabling each user thread that is to engage in a collective communications operation to, when said user thread is to engage in the collective communications operation, perform a lock operation to acquire the general communication regulation lock, each user thread that is to engage in the collective communications operation being configured to engage in the collective communications operation after acquiring said general communication regulation lock.

17. The method as defined in claim 16 further comprising the step of enabling said thread to release said general communication regulation lock and said non-collective communication regulation lock after said non-collective communications operation.

18. The method as defined in claim 16 further comprising the step of enabling said thread to release said general communication regulation lock after said collective communications operation.

19. A method of coordinating message receive operations among user threads in a process, said user threads being configured to communicate using a selected message passing methodology, the communications coordinating arrangement comprising the steps of, for each thread that is to engage in a message receive operation:

A. iteratively perform a locked message probe operation in which said respective thread initially acquires a message probe lock that regulates said locked message probe operation as among threads in said process, performs a non-blocking probe operation that allows each user thread to engage in message receive operations at substantially the same time, and determines, in response to the non-blocking probe operation, whether a message is available for the respective thread, and B. if a thread determines that a message is available for the respective thread, receive the message.

20. The method as defined in claim 19 in which the locked message probe operation further includes the step of releasing the message probe lock after determining whether a message is available for the respective thread.

21. The method as defined in claim 19 in which the message receive step further includes the step of acquiring a message receive lock prior to receiving the message.

22. The method as defined in claim 21 in which the message receive step further includes the step of releasing the message receive lock after receiving the message.

23. A computer program product for use in connection with a computer to provide collective communications coordinating arrangement for coordinating collective and non-collective communications operations among user threads in a plurality of processes, said user threads being configured to communicate using a selected message passing methodology, said computer program product comprising a computer-readable medium having encoded thereon:

A. a slave thread module configured to enable the computer to provide, for use in connection with each of said processes, a respective slave thread that is configured to enable a computer to, in response to a collective communications request from a respective user thread in its associated process, generate a collective communications request message for transmission to a master thread, and, in response to a collective communications grant from said master thread, enable said respective user thread to engage in said collective communications operation;

B. a master thread module configured to enable the computer to provide said master thread, said master thread being configured to enable the computer to, after receiving collective communications request messages from all of the slave threads associated with processes that contain user threads that are to engage in the collective communications operation, generate said collective communications grant for transmission to the slave threads of all of the processes which contain user threads which are to engage in the collective communications operation; and C. the slave thread module and the master thread module being configured to:

i.) allow, prior to the master thread receiving collective communications request messages from all of the slave threads associated with collective communications requesting user threads, non-collective communications among the collective communications requesting user threads, and ii.) allow, after the master thread receives collective communications request messages from all of the slave threads associated with collective communications requesting user threads and enables the collective communications requesting user threads to engage in the collective communications operation, non-collective communications among user threads not engaged in collective communications operations.

24. The computer program product of claim 23 in which said collective communications grant comprises an initial communication grant message, each slave thread being configured to enable the computer to, in response to said initial communication grant message, acquire a message transmission regulation lock that regulates transmission of messages by threads in said process.

25. The computer program product of claim 24 in which said collective communications grant comprises a second communication grant message generated after said initial communication grant message, each slave thread being configured to enable the computer to, in response to said second communication grant message, transfer control of said thread to said respective user thread in said respective process that is to engage in said collective communications operation.

26. The computer program product of claim 24 in which each user thread is configured to enable the computer to, after performing said collective communications operation, release the message transmission regulation lock.

27. A computer program product for use in connection with a computer to coordinate collective and non-collective communications operations among user threads in a process, said user threads being configured to communicate using a selected message passing methodology, said computer program product comprising a computer-readable medium having encoded thereon:
   A. associated with each said user thread to engage in a non-collective communications operation, a non-collective communication operation control module configured to enable a computer to, when said user thread is to engage in the non-collective communications operation, initially perform a first lock operation to acquire a non-collective communication regulation lock which regulates transmission of messages in non-collective communications operations as among user threads in said process and, after acquiring the non-collective communication regulation lock, perform a second lock operation to acquire a general communication regulation lock, each user thread that is to engage in the non-collective communications operation being configured to engage in the non-collective communications operation after acquiring both said non-collective communication regulation lock and said general communication regulation lock; and
   B. associated with each said user thread to engage in a collective communications operation, a collective communication operation control module configured to enable the computer to, when said user thread is to engage in the collective communications operation, perform a lock operation to acquire the general communication regulation lock, each user thread that is to engage in the collective communications operation being configured to engage in the collective communication operation after acquiring said general communication regulation lock.

28. The computer program product of claim 27 wherein the computerized device is further configured to release said general communication regulation lock and said non-collective communication regulation lock after said non-collective communications operation.

29. The computer program product of claim 28 in which said collective communication operation control module is further configured to release said general communication regulation lock after said collective communications operation.

30. A computer program product for use in connection with a computer to coordinate message receive operations among user threads in a process, said user threads being configured to enable the computer to communicate using a selected message passing methodology, the computer program product comprising a computer-readable medium having encoded thereon:
   A. a probe control module configured to enable a computer to iteratively perform a locked message probe operation in which it initially acquires a message probe lock that regulates said locked message probe operation as among threads in said process, performs a non-blocking probe operation that allows each user thread to engage in message receive operations at substantially the same time, and determines, in response to the non-blocking probe operation, whether a message is available for the respective thread, and
   B. a message receive control module configured to enable the computer to, if the message probe control module determines that a message is available for the respective thread, receive the message.

31. The computer program product of claim 30 in which the probe control module is further configured to enable the computer to release the message probe lock after determining whether a message is available for the respective thread.

32. The computer program product of claim 30 in which the message receive control module is further configured to enable the computer to acquire a message receive lock prior to receiving the message.

33. The computer program product of claim 32 in which the message receive control module is further configured to enable the computer to release the message receive lock after receiving the message.

34. The communications coordinating arrangement of claim 5 wherein the collective communication operation control module is configured to prioritize collective communications message transfer operations among user threads in the process relative to non-collective communications message transfer operations among user threads in the process.

35. The method of claim 16 wherein the step of enabling each user thread that is to engage in a collective communications operation to perform a lock operation to acquire the general communication regulation lock comprises prioritizing collective communications message transfer operations among user threads in the process relative to non-collective communications message transfer operations among user threads in the process.

36. The computer program product of claim 27 wherein the collective communication operation control module is configured to prioritize collective communications message transfer operations among user threads in the process relative to non-collective communications message transfer operations among user threads in the process.

37. The communications coordinating arrangement of claim 8 wherein the message receive control module is configured to, when receiving the message, perform a non-blocking receive operation.

* * * * *

UNITED STATES PATENT AND TRADEMARK OFFICE
CERTIFICATE OF CORRECTION

PATENT NO.   : 6,766,517 B1
DATED        : July 20, 2004
INVENTOR(S)  : Dan Bernardo Page 1 of 1

It is certified that error appears in the above-identified patent and that said Letters Patent is hereby corrected as shown below:

<u>Column 12,</u>
Line 26, "operation whether a message" should read -- operation, whether a message --.

Signed and Sealed this

Twenty-eighth Day of December, 2004

JON W. DUDAS
*Director of the United States Patent and Trademark Office*